(12) United States Patent
Ohmori

(10) Patent No.: US 7,900,180 B2
(45) Date of Patent: Mar. 1, 2011

(54) SEMICONDUCTOR CHIP USING SPECIFICATION INTERFACE

(75) Inventor: Mutsuhiro Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 685 days.

(21) Appl. No.: 11/898,241

(22) Filed: Sep. 11, 2007

(65) Prior Publication Data

US 2008/0104366 A1 May 1, 2008

(30) Foreign Application Priority Data

Oct. 25, 2006 (JP) .............................. 2006-290090

(51) Int. Cl.
G06F 17/50 (2006.01)

(52) U.S. Cl. ....................... 716/132; 716/100; 716/106; 716/107

(58) Field of Classification Search ................. 716/100, 716/106, 107, 132
See application file for complete search history.

(56) References Cited

U.S. PATENT DOCUMENTS 7,512,512 B2 * 3/2009 Foote et al. .................. 702/127

FOREIGN PATENT DOCUMENTS

EP 1 806 847 A1 7/2007
WO WO-2006046711 5/2006

* cited by examiner

Primary Examiner—Thuan Do
(74) Attorney, Agent, or Firm—Rader, Fishman & Grauer PLLC

(57) ABSTRACT

Disclosed herein is a semiconductor chip including at least two processing apparatuses which comply with the same interface specifications and which differ in internal structure, wherein at least one of the processing apparatuses is constituted functionally to replace at least one processing apparatus.

7 Claims, 5 Drawing Sheets

SEMICONDUCTOR CHIP USING SPECIFICATION INTERFACE

CROSS REFERENCE TO RELATED APPLICATIONS

The present invention contains subject matter related to Japanese Patent Application JP 2006-290090 filed with the Japan Patent Office on Oct. 25, 2006, the entire contents of which are incorporated herein by reference.

BACKGROUND OF THE INVENTION

1. Field of the Invention

The present invention relates to a semiconductor chip that includes a plurality of processing apparatuses, such as so-called processor elements.

2. Description of the Related Art

There have been proposed a number of techniques for enabling a semiconductor chip, including a plurality of processor elements (PE) of the same type, to implement necessary functions using a PE array. However, a comparable wired-logic (WL) device generally is at least 10 times as powerful as a semiconductor chip of the above type in performance.

A typical PE array-based data processing apparatus is disclosed illustratively in WO 2006/046711 A1.

The disclosed data processing apparatus has an array of PEs each containing logical circuit hardware control information that can be reconstituted on a cycle-by-cycle basis. Equipped with a plurality of facilities for selecting cycle-based mapping information, this data processing apparatus may have its arrayed PEs programmed into diverse logic circuits as desired.

SUMMARY OF THE INVENTION

In implementing a two-input NAND device, the data processing apparatus described in the above-cited document occupies an area at least 10 times as wide as a standard cell two-input NAND setup; power dissipation may also be raised correspondingly.

Frequently, however, some of the PEs configured need be arranged to constitute fixed functions. If these parts still occupy at least 10 times as much hardware space as the standard type, this amounts to a very low level of efficiency.

Typically, discrete cosine transformation (DCT) circuits dedicated primarily to executing image compression and expansion are used at every turn and thus need not be reconstituted dynamically; they need be furnished as fixed functions.

Furthermore, if certain functions are simply replaced by stationary circuits disrupting PE interface consistency, these circuits may not be backed up by redundant circuits. This can lead to reduced chip yields.

The present invention has been made in view of the above circumstances and it is desirable to provide a semiconductor chip capable of reducing the volume of processing apparatus hardware for fixed functions while implementing facilities for backing up the reduced hardware portions with redundancy.

According to an embodiment of the present invention, there is provided a semiconductor chip including at least two processing apparatuses which comply with the same interface specifications and which differ in internal structure, wherein at least one of the processing apparatuses is constituted functionally to replace at least one processing apparatus.

Preferably, the semiconductor chip of the present invention may further include a redundant processing apparatus capable of functionally replacing at least one processing apparatus, wherein some of the other processing apparatuses may be replaced in case of a failure by the redundant processing apparatus acting as a backup.

According to another embodiment of the present invention, there is provided a semiconductor chip including a plurality of processing apparatuses having the same functionality. If a function that can be implemented by any one of the processing apparatuses is fixable, then that processing apparatus has the fixable function fixed therein while complying with the same interface specifications as those of the other processing apparatuses.

Preferably, the processing apparatus having the fixable function may be replaced by a wired-logic circuit complying with the same interface specifications as those of the processing apparatus.

Preferably, the processing apparatus having the fixable function may have unused functions either removed therefrom or simplified therein.

Preferably, the processing apparatus having the fixable function may be furnished with a higher functionality than the other processing apparatuses.

Preferably, the semiconductor chip of the present invention may further include a larger number of processing apparatuses than are necessary in order to provide redundancy for backup purposes.

Preferably, if a processing apparatus has failed, then the address of the failed processing apparatus may be canceled and established anew as the address of a redundant processing apparatus acting as a backup.

Preferably, the semiconductor chip of the present invention may further include a ring bus formed by a plurality of ring hubs connected to form a ring structure. The plurality of processing apparatuses may be connected to the plurality of ring hubs on a one-to-one basis. If a processing apparatus has failed, then the address of the failed processing apparatus may be canceled and established anew as the address of a redundant processing apparatus acting as a backup.

Preferably, the semiconductor chip of the present invention may further include a routing device formed by a plurality of routers. The plurality of processing apparatuses may be connected to the plurality of routers on a one-to-one basis. If a processing apparatus has failed, then the address of the failed processing apparatus may be canceled and established anew as the address of a redundant processing apparatus acting as a backup.

The semiconductor chip according to an embodiment of the present invention, as outlined above, incorporates at least two processing apparatuses which comply with the same interface specifications and which differ in internal structure.

With this structure, at least one of the processing apparatuses is constituted functionally to replace at least one processing apparatus.

The inventive semiconductor chip thus reduces the hardware volume of the processing apparatuses having fixed functions while offering facilities for replacing an affected processing apparatus with redundancy for backup purposes.

BRIEF DESCRIPTION OF THE DRAWINGS

Further advantages of the present invention will become apparent upon a reading of the following description and appended drawings in which.

DETAILED DESCRIPTION OF THE PREFERRED EMBODIMENTS

Preferred embodiments of the present invention will now be described in reference to the accompanying drawings.

Figure 1:
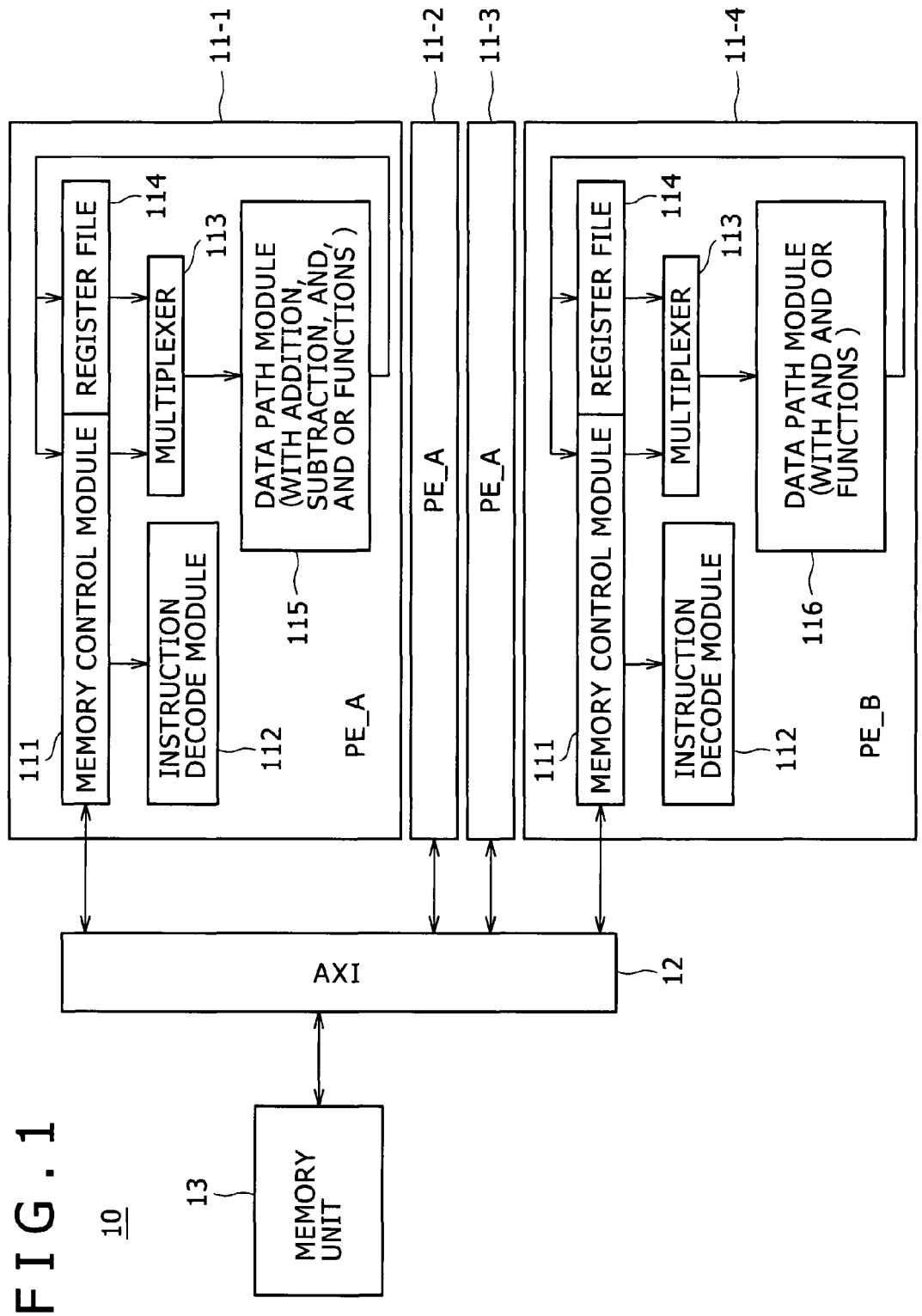
FIG. 1 is a block diagram showing a typical structure of a semiconductor chip practiced as one embodiment of the present invention.

FIG. 1 is a block diagram showing a typical structure of a semiconductor chip (semiconductor integrated circuit) 10 practiced as a first embodiment of the present invention. The semiconductor chip 10 in FIG. 1 includes a plurality of (e.g., four) processor elements PE_A11-1 through PE_A11-3 as well as PE_B11-4, which comply with the same interface specifications, an AXI (Advanced Extensible Interface) bus 12 serving to connect the internal components, and a memory unit 13.

In the first embodiment, three processor elements PE_A11-1 through PE_A11-3 comply with the same interface specifications and have the same internal structure. The processor element PE_B11-4 complies with the same interface specifications but has a different internal structure. For the purpose of simplification and illustration, FIG. 1 outlines the structure of the processor element PE_A11-1 representing the other two processor elements PE_A11-2 and PE_A11-3 having the same structure.

Basically, the semiconductor chip 10 of the first embodiment has at least two PEs which comply with the same interface specifications and which have different internal structures. At least one of the PEs is designed to be a semiconductor device for functionally replacing at least one PE.

If a function implemented by any one of the PEs having the same structure in the semiconductor chip turns out to be fixable, then that PE having the fixable function may be replaced by a PE with a wired-logic (WL) circuit complying with the same interface specifications as the PE.

It is also possible not to replace an entire PE with the WL circuit but to replace the PE in question with another PE having unused functions either removed therefrom or simplified therein. Another possibility is to replace one PE with another PE with its functions partially replaced by the WL circuit. These measures contribute to reducing the area of the chip and lowering its cost. In other words, each functionally replaceable PE is designed to have data path arrangements for removing or simplifying certain functions of the original PE.

It might be said that the PE is a data processing device, such as a processing apparatus constituted by a sequencer and a data path, or a lookup table (LUT) in which certain logic functions can be programmed.

In the semiconductor chip 10 of FIG. 1, a plurality of processor elements PE_A11-1 through PE_A11-3 are connected to the AXI bus 12. Also connected to the AXI bus 12 is the processor element PE_B11-4 formed by removing the addition and subtraction functions from the data path facility of each of the processor elements PE_A11-1 through PE_A11-3.

Each of the multiple processor elements PE_A11-1 through PE_A11-3 has a memory control module 111, an instruction decode module 112, a multiplexer 113, a register file 114, and a data path module 115.

The data path module 115 is structured illustratively to include the addition, subtraction, AND, and OR functions. In each of the processor elements PE_A11-1 through PE_A11-3, the memory control module 111, the instruction decode module 112, and the multiplexer 113 illustratively combine to provide interface facilities.

The processor element PE_B11-4 has a memory control module 111, an instruction decode module 112, a multiplexer 113, a register file 114, and a data path module 116.

In the processor element PE_B11-4, too, the memory control module 111, the instruction decode module 112, and the multiplexer 113 illustratively combine to provide interface facilities. That is, the processor element PE_B11-4 complies with the same interface specifications as those of the processor elements PE_A11-1 through PE_A11-3.

As discussed above, the data path module 116 has the AND and OR functions. This functional configuration is obtained by removing the addition and subtraction functions from the functionality of the data module 115 for each of the PE_A11-1 through PE_-A11-3 including the addition, subtraction, ADD, and OR functions.

In other words, the processor elements PE_A11-1 through PE_A11-3 and the processor element PE_B11-4 comply with the same interface specifications; the processor element PE_B11-4 is structured to have the data path module 116 deprived of certain functions found in the original processor element PE_A.

How the above-described embodiment operates will now be described. The emphasis is on the workings of the processor elements PE_A and PE_B which comply with the same interface specifications but which differ in internal structure.

The processor element PE_A operates as a typical processor. In operation, an instruction code is fetched from the memory unit 13 by the memory control module 111 through the AXI bus 12. The instruction decode module 112 decodes the fetched instruction code and provides sequence control corresponding to the decoded instruction code.

In accordance with the decoded instruction code, the data to be operated on is selected from the memory unit 13 via the memory control module 111 or from the register file 114 by way of the multiplexer 113. The selected data is transmitted to the data path module 115.

The data path module 115 operates on the data as directed by the coded instruction code. The result of the operation is sent to the memory unit 13 via the memory control module 111 or written directly back to the register file 114.

The processor element PE_B operates approximately in the same manner as the processor element PE_A except that the processor element PE_B is fed solely with programs not involving addition and subtraction. Very much simplified, this example nevertheless represents the typical setup in which the processor element PE_B with limited functionality replaces another processor element PE_A dedicated to a particular application. This structure contributes to reducing the area of the semiconductor chip and lowering its power dissipation. It is also possible to use a simplified instruction decode function in the processor element PE_B.

As described, the first embodiment includes the multiple processor elements PE_A11-1 through PE_A11-3 and the processor element PE_B11-4 devoid of the addition and subtraction functions that are offered by the data path facility of each of the PE_A11-1 through PE_A11-3, all processor elements PE_A11-1 through PE_A11-3 and PE_B11-4 being connected to the AXI bus 12 to which the memory unit 13 is connected. This structure helps reduce the area of the semiconductor chip, decrease its power dissipation, and lower its cost.

Figure 2:
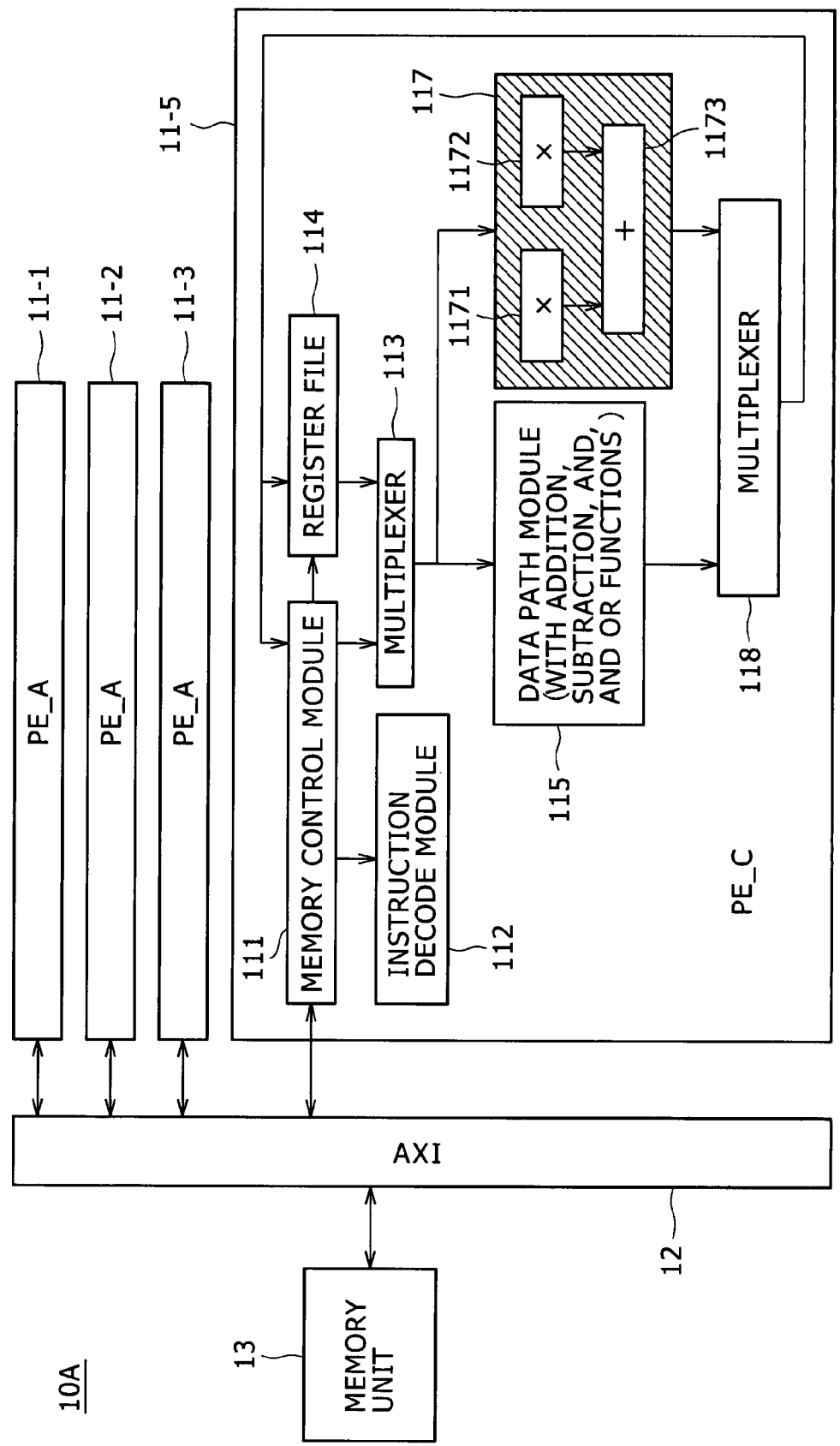
FIG. 2 is a block diagram showing a typical structure of a semiconductor chip practiced as another embodiment of the present invention.

FIG. 2 is a block diagram showing a typical structure of a semiconductor chip practiced as a second embodiment of the present invention. The difference between the semiconductor chip 10A of the second embodiment and the semiconductor chip 10 of the first embodiment is that the semiconductor chip 10A has a processor element PE_C11-5 which replaces the processor element PE_B11-4 with a data path deprived of certain functions integral to the processor element PE_A and which has a data path offering higher functionality than the PE_A.

More specifically, a plurality of processor elements PE_A11-1 through PE_A11-3 and a memory unit 13 are connected to an AXI bus 12. Also connected to the AXI bus 12 is another processor element PE_C11-5. Of the data path functions of the processor elements PE_A11-1 through PE_A11-3, those that would need to be executed in a plurality of clock steps by the processor element PE_A are handled by the processor element PE_C11-5 which includes a data path module 117 with dedicated circuits to carry out the data path functions in question in fewer clock steps than the PE_A according to data flow graphs specific to the processes required.

The processor element PE_C11-5 has a multiplexer 118 that selects the result of the operation by a data path module 115 or by the data module 117 and supplies what is selected to the memory control module 111 and register file 114. The data path module 117 includes two multipliers 1171 and 1172 and an adder 1173 which adds up the products coming from the multipliers 1171 and 1172.

In the processor element PE_C11-5, two multiplications by the multipliers 1171 and 1173 followed by an addition by the adder 1173 are performed in a single clock step, replacing that process of each of the processor elements PE_A11-1 through PE_A11-3 in which two multiplications are carried out using a combination of multiple instruction codes for additions and subtractions followed by an addition. The result of the operation is written by the multiplexer 118 to the register file 114 or back to the memory unit 13 via the memory control module 111.

According to the second embodiment, the clock steps by the processor element PE_C are fewer than by the processor element PE_A and allow the PE_C to reduce its internal clock frequency correspondingly. When observed from the outside, the processor elements PE_A and PE_C comply with the same interface specifications but the processor element PE_C has a lower operation frequency and consumes less power than the other processor element while doing the same processing. Furthermore, the processor element PE_C forwards the result of multiplications directly to the adder 1173 and is thus subject to fewer data writes and reads to and from the register file 114 than the processor element PE_A. This further enables the processor element PE_C to lower its power dissipation.

According to the first and the second embodiments, as described above, it is possible to constitute a semiconductor chip that has any of its component processor elements replaced by a redundant processor element capable of replacing the functions of at least one PE as a backup.

Also according to the first and the second embodiments, it might happen that in a semiconductor chip including a plurality of processor element of the same type, a function implemented by a PE is found replaceable by a fixed function. In such a case, the PE executing the function may be replaced by another PE with its functions fixed using a wired logic (WL) circuit complying with the same interface specifications as the original PE. It is also possible not to replace an entire PE with the WL circuit but to replace the PE in question with another PE having unused functions either removed therefrom or simplified therein. Another possibility is to replace one PE with another PE with its functions partially replaced by the WL circuit. These measures contribute to reducing the area of the chip and lowering its cost.

The semiconductor chip of the above-described structures is furnished with a larger number of processor elements than are necessary in order to provide redundancy for backup purposes. Notwithstanding the increased number of PEs resulting in a greater chip area, this type of semiconductor chip with its high yields can be manufactured in larger numbers of non-defective units than before.

Illustratively, a ring bus, a routing device or the like that allows the PE targeted for processing to be relocated with no problem in a PE-to-PE connection architecture may include at least one PE as a redundancy in the ring bus or routing device structure. The redundant PE may be used to replace a failed PE or WL circuit as a backup.

Figure 3:
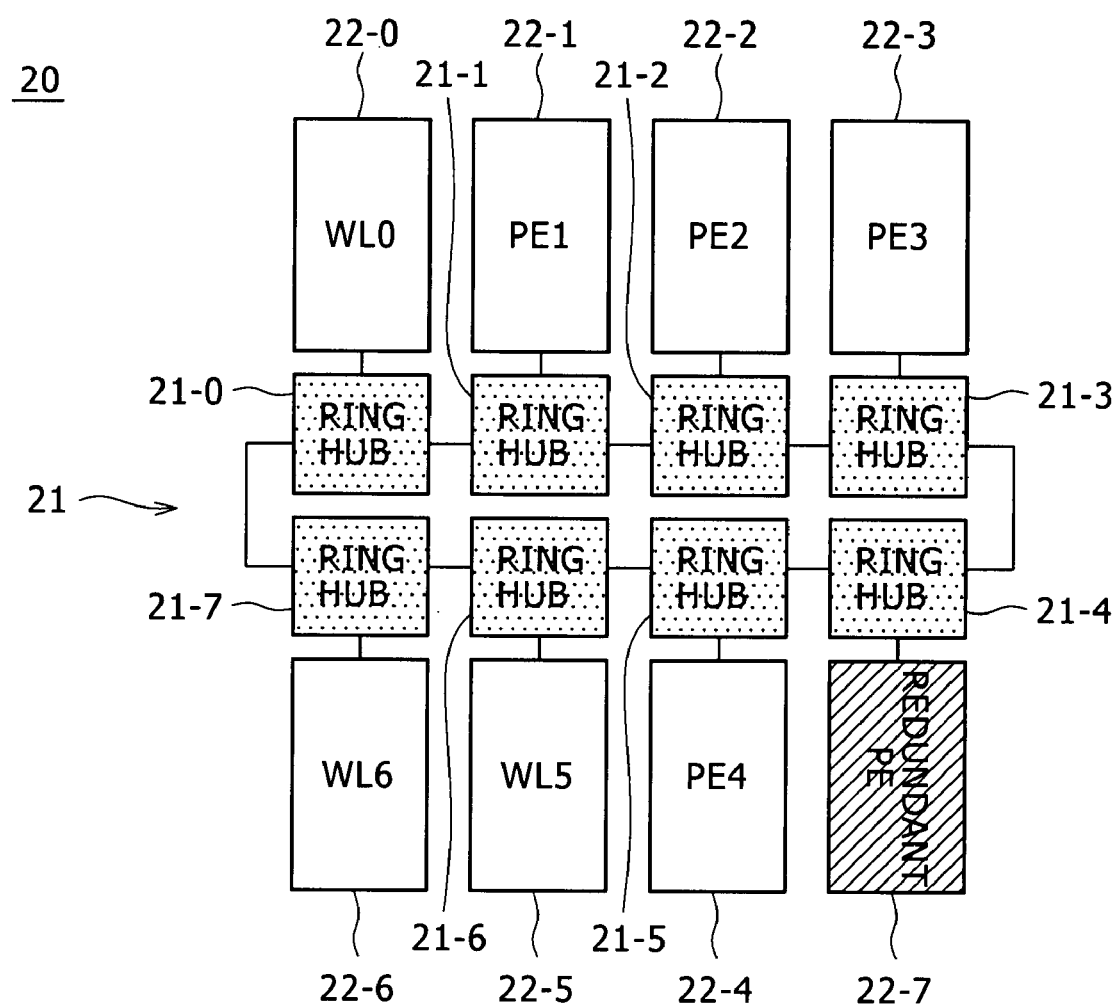
FIG. 3 is a schematic view showing a typical structure of a semiconductor chip practiced as a further embodiment of the present invention, the semiconductor chip having a redundant PE connected to a ring bus.

FIG. 3 is a schematic view showing a typical structure of a semiconductor chip 20 practiced as a third embodiment of the present invention, the semiconductor chip having a redundant PE connected to its ring bus. The semiconductor chip 20 includes a ring bus 21 having eight ring hubs 21-0 through 21-7, the corresponding number of usual WL circuits or processor elements PE22-0 through PE22-6, and a redundant processor element PE22-7.

The ring bus 21 has the eight ring hubs 21-0 through 21-7 connected in a ring-like manner. The WL(0) 22-0 is connected to the ring hub 21-0; the processor element PE(1) 22-1 is connected to the ring hub 21-1 the processor element PE(2) 22-2 is connected to the ring hub 21-2; the processor element PE(3) 22-3 is connected to the ring hub 21-3; the redundant processor element PE22-7 is connected to the ring hub 21-4; the processor element PE(4) 22-4 is connected to the ring hub 21-5; the WL(5) 22-5 is connected to the ring hub 21-6; and the WL(6) 22-6 is connected to the ring hub 21-7.

Figure 4:
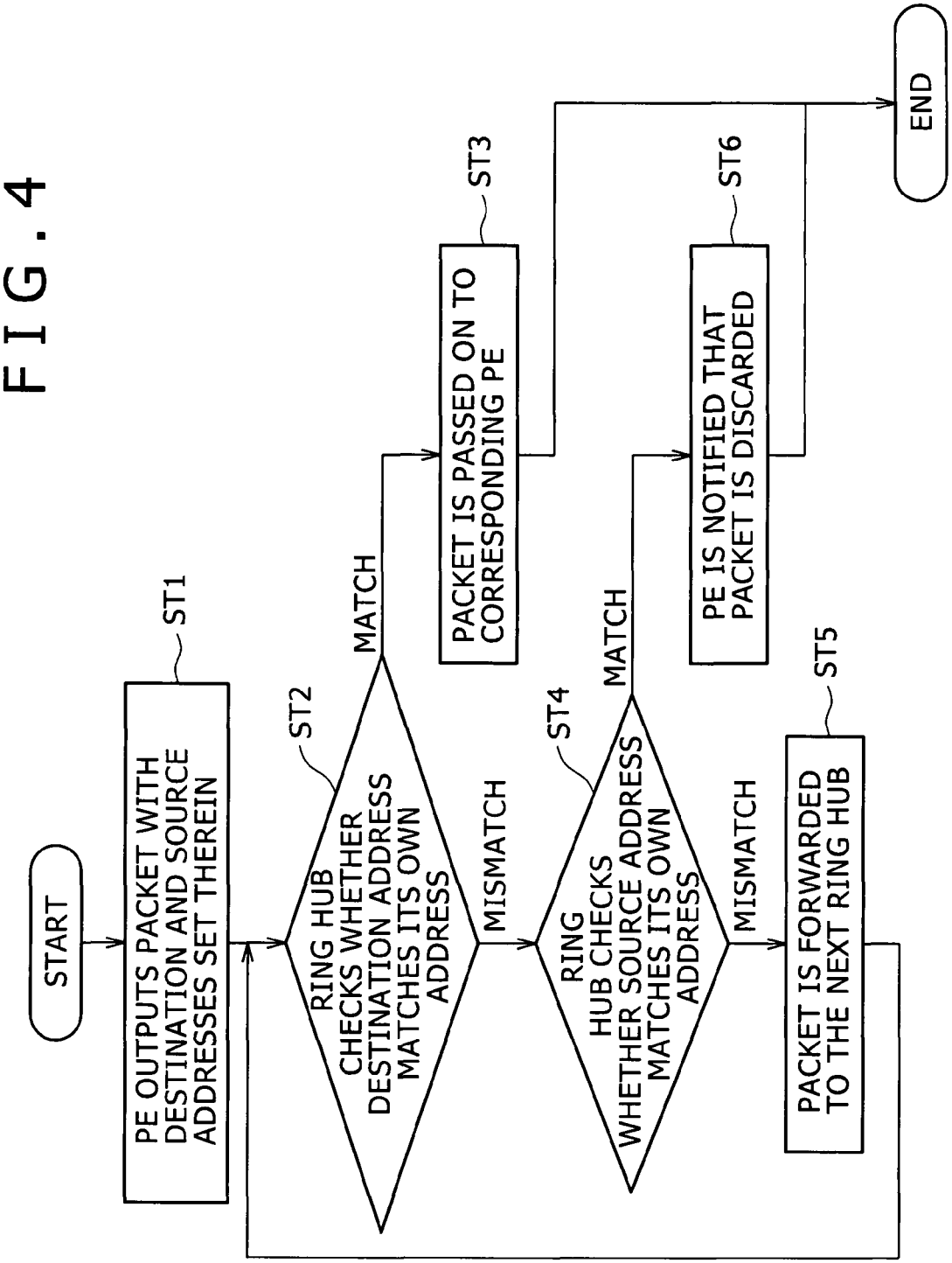
FIG. 4 is a flowchart of steps in which a data packet is transferred from one PE to another over the ring bus.

FIG. 4 is a flowchart of the steps in which a data packet is transferred from one processor element PE to another over the ring bus. In step ST1, a PE illustratively attaches its own address as a source address to a data packet together with a data destination address. The data packet is then transferred from the ring hub to which the packet-originating PE is connected to the next ring hub.

In step ST2, the next ring hub checks to determine whether its own address matches the destination address of the incoming data packet. In the case of a match, step ST3 is reached. In step ST3, the ring hub hands the data packet over to the corresponding PE and terminates the process.

In the case of a mismatch in step ST2, step ST4 is reached. In step ST4, the ring hub compares its own address with the destination address of the data packet. In the case of a mismatch in step ST4, step ST5 is reached. In step ST5, the data packet is passed on to the next ring hub.

A match in step ST4 signifies that the data packet has made a tour of the entire ring and has failed to find the destination. In this case, step ST6 is reached and the data packet is discarded. The packet-originating PE is notified that the data packet has failed to reach its destination, and the process is terminated.

Where the above arrangements are in place, the addresses of the ring hubs may be manipulated to change the roles of the corresponding PEs as desired. This provides for a processor element redundancy for backup purposes.

Suppose that in the ring bus example of FIG. 3, the processor element PE(2) 22-2 has failed. In that case, the packet address of the PE(2) 22-2 is canceled and established anew as the packet address of the redundant PE 22-7. This makes it possible for the redundant PE 22-7 to process all data packets destined for the PE(2) 22-2. Likewise, if the WL(5) 22-5 has failed, the packet address of the WL(5) 22-5 is canceled and established anew as the address of the redundant PE 22-7. Then all packets destined for the WL(5) 22-5 can be directed to and processed by the redundant PE 22-7.

According to the third embodiment of the present invention, despite the increased number of PEs resulting in a greater chip area, this type of semiconductor chip with its high yields can be manufactured in larger numbers of non-defective units than before.

Figure 5:
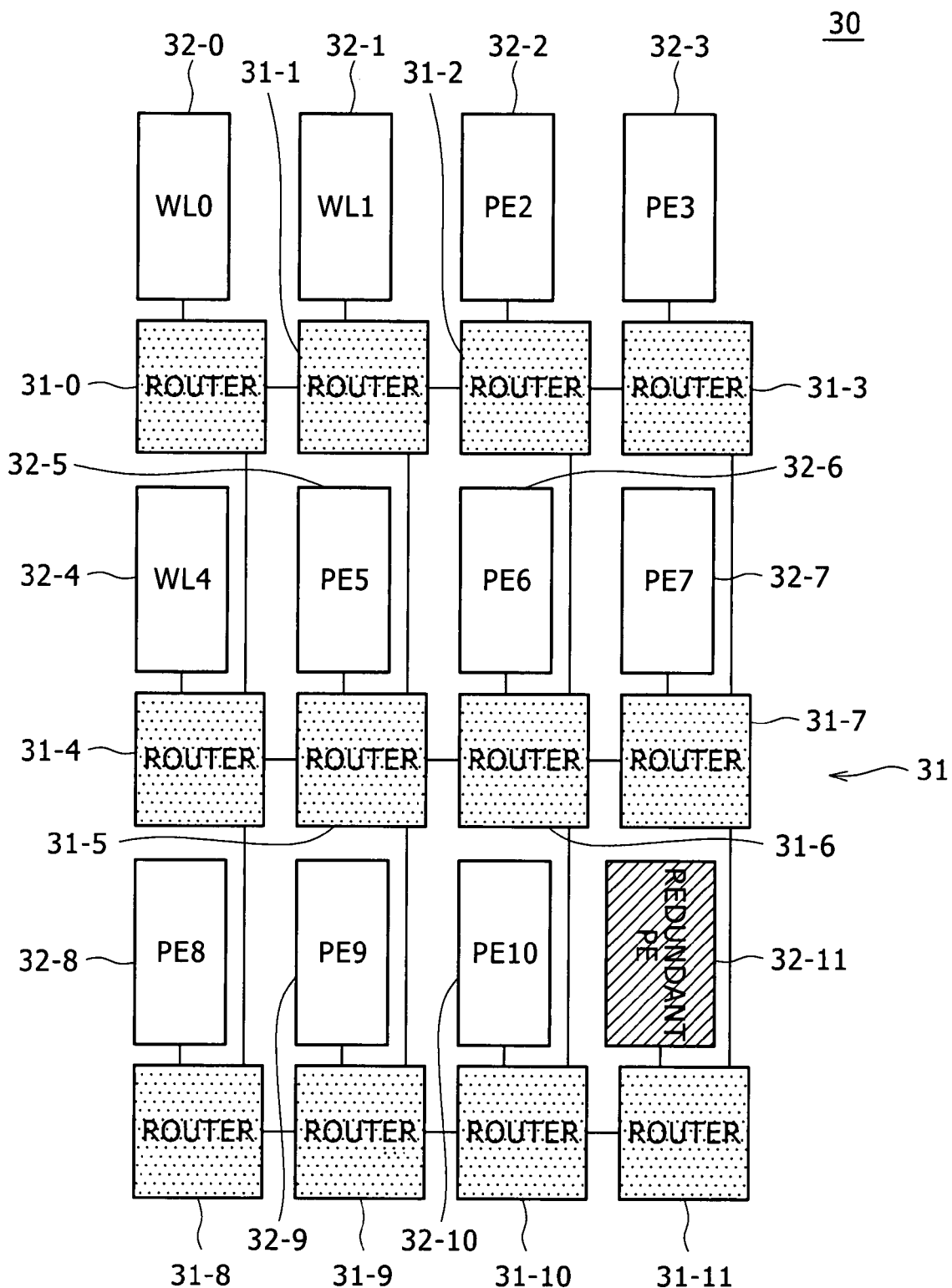
FIG. 5 is a schematic view showing a typical structure of a semiconductor chip practiced as an even further embodiment of the present invention, the semiconductor chip having a redundant PE connected to a routing device.

FIG. 5 is a schematic view showing a typical structure of a semiconductor chip 30 practiced as a fourth embodiment of the present invention, the semiconductor chip having a redundant PE connected to its routing device. The semiconductor chip 30 in FIG. 5 includes a routing device 31 having 12 routers 31-0 through 31-11, the corresponding number of usual WL circuits or processor elements PE32-0 through PE32-10, and a redundant processor element PE32-11.

In the routing device 31, the router 31-0 is connected to the routers 31-1 and 31-4 as well as to the WL(0) 32-0. The router 31-1 is connected to the routers 31-0, 31-2, and 31-5 as well as to the WL(1) 32-1. The router 31-2 is connected to the routers 31-1, 31-3, and 31-6 as well as to the PE(2) 32-2. The router 31-3 is connected to the routers 31-2 and 31-7 as well as to the PE(3) 32-3.

The router 31-4 is connected to the routers 31-0, 31-5, and 31-8 as well as to the WL(4) 32-4. The router 31-5 is connected to the routers 31-1, 31-4, 31-6, and 31-9 as well as to the PE(5) 32-5. The router 31-6 is connected to the routers 31-2, 31-5, 31-7, and 31-10 as well as to the PE(6) 32-6. The router 31-7 is connected to the routers 31-3, 31-6, and 31-11 as well as to the PE(7) 32-7.

The router 31-8 is connected to the routers 31-4 and 31-9 as well as to the PE(8) 32-8. The router 31-9 is connected to the routers 31-5, 31-8, and 31-10 as well as to the PE(9) 32-9. The router 31-10 is connected to the routers 31-6, 31-9, and 31-11 as well as to the PE(10) 32-10. The router 31-11 is connected to the routers 31-7 and 31-10 as well as to the redundant PE 32-11.

In the routing example of FIG. 5, as in the ring bus example of FIG. 3, the packet address of a failed PE or WL is canceled and established anew as the packet address of the redundant PE 32-11 used as a backup. This arrangement makes it possible to bypass the failed PE.

According to the fourth embodiment of the present invention, as discussed above, despite the increased number of PEs resulting in a greater chip area, this type of semiconductor chip with its high yields also can be manufactured in larger numbers of non-defective units than before.

Structured as described above, the semiconductor chip of the present invention offers the following major effects: the semiconductor chip is designed to have a lower-leaking transistor makeup that translates its higher efficiency in performance into less power dissipation; the semiconductor chip can run on a lower voltage than before, and have the power supply removed from the power gate for a longer period of time than ever; with its component PEs checked for functionality, the semiconductor chip may have its own fixable functions fixed and then replaced by stationary circuits without delay, which significantly enhances the efficiency of chip development; and opposed to the traditional makeup in which PEs are not switched, the inventive structure reduces the area of the semiconductor chip and allows the chip to be manufactured in larger numbers of non-defective units than before, whereby the unit price of the semiconductor chip can be lowered.

It should be understood by those skilled in the art that various modifications, combinations, subcombinations and alterations may occur depending on design and other factor insofar as they are within the scope of the appended claims or the equivalents thereof.

What is claimed is:

1. A semiconductor chip comprising:
    a plurality of processing apparatuses having the same interface functionality;
    a larger number of processing apparatuses than are necessary in order to provide redundancy circuitry for backup purposes,
    wherein, a function that can be implemented by any one of said processing apparatuses is fixable, then that processing apparatus has the fixable function fixed therein while complying with the same interface specifications as those of the other processing apparatuses.

2. The semiconductor chip according to claim 1, wherein the processing apparatus having said fixable function is replaced by a wired-logic circuit complying with the same interface specifications as those of said processing apparatus.

3. The semiconductor chip according to claim 1, wherein the processing apparatus having said fixable function has unused functions either removed therefrom or simplified therein.

4. The semiconductor chip according to claim 1, wherein the processing apparatus having said fixable function is furnished with higher functionality than the other processing apparatuses.

5. The semiconductor chip according to claim 1, wherein, if a processing apparatus has failed, then the address of the failed processing apparatus is canceled and established anew as the address of a redundant processing apparatus acting as a backup.

6. The semiconductor chip according to claim 1, further comprising:
    a ring bus formed by a plurality of ring hubs connected to form a ring structure,
    wherein said plurality of processing apparatuses are connected to said plurality of ring hubs on a one-to-one basis and
    if a processing apparatus has failed, then the address of the failed processing apparatus is canceled and established anew as the address of a redundant processing apparatus acting as a backup.

7. The semiconductor chip according to claim 1, further comprising:
    a routing device formed by a plurality of routers,
    wherein said plurality of processing apparatuses are connected to said plurality of routers on a one-to-one basis and
    if a processing apparatus has failed, then the address of the failed processing apparatus is canceled and established anew as the address of a redundant processing apparatus acting as a backup.

* * * * *